J. H. STILLWAGGON.
MOVING PICTURE MACHINE.
APPLICATION FILED AUG. 14, 1917. RENEWED DEC. 31, 1918.

1,317,996.

Patented Oct. 7, 1919.
7 SHEETS—SHEET 6.

UNITED STATES PATENT OFFICE.

JOHN H. STILLWAGGON, OF NEW YORK, N. Y., ASSIGNOR TO AUTO SLYDE & MOVING PICTURE MACHINE CO., INC., OF NEW YORK, N. Y., A CORPORATION OF NEW YORK.

MOVING-PICTURE MACHINE.

1,317,996.      Specification of Letters Patent.      Patented Oct. 7, 1919.

Application filed August 14, 1917, Serial No. 186,104. Renewed December 31, 1918. Serial No. 269,173.

*To all whom it may concern:*

Be it known that I, JOHN H. STILLWAGGON, a citizen of the United States, residing at Richmond Hill, in the county of Queens, city and State of New York, have invented an Improvement in Moving-Picture Machines, of which the following is a specification.

Heretofore in the operation of moving picture machines as commonly constructed, it is necessary to place a reel of film in the machine, and in the operation of the apparatus by suitable mechanism, this film is unwound from the reel, passed over an optical center, travels with an intermittent motion and is wound on another reel. After the reel is thus run off, it is necessary to rewind the film on to the first reel from the second reel after the reels have been removed from the machine in order to have the film ready for re-use. In the interval between removing and placing the film reels in the machine, it is customary in some instances to project slides of any suitable nature, showing advertisements or pictures upon the screen, and in other instances to employ a plurality of machines used alternately so that the moving picture performance is continuous.

The various operations of changing and rewinding the reels at the present time are performed manually, and the object of my invention is the provision of a moving picture apparatus in which these various operations are performed automatically, and in carrying out the same I prefer to employ a film actuating mechanism which is mounted upon a reciprocating carriage normally maintained in an initial inoperative position, means for moving the carriage so that the film is moved into and out of an operative position. I also provide means for automatically starting the film actuating mechanism after the carriage is moved into its operative position and for automatically reversing and rewinding the film after the carriage is moved out of and has been returned to its initial position. As will be understood, the period in which the film carriage remains in its initial position may be only sufficient to rewind the film, or it may be any greater length of time, as is desired, and while this interval may be governed by any suitable mechanism, I employ, as shown and described in the present machine, a device operated by an endless conveyer for this purpose. This endless conveyer preferably carries a plurality of slides which are successively projected on the screen during the interval in which the film is being rewound and the slides thus displayed may be of an advertising or pictorial nature, as desired. When it is not desired to display slides my invention comprises an apparatus in which there is a battery of machines adapted to be successively operated to show the roll of film in each machine in turn. In this form of the invention when one roll of film is unwound it automatically starts the second machine, and its movement is reversed so as to rewind, and when rewound is stopped, and this is repeated until the rolls in each machine are shown.

From the foregoing, it will therefore be seen that in the use of the form of my improved moving picture as herein shown and described, appropriate slides are successively thrown on the screen and at predetermined intervals a reel of moving pictures is displayed on the screen, the film carriage for which, being moved automatically into place without change of lenses, and immediately after the moving picture reel is run off, the reel carriage is automatically returned to its initial position and the slides again displayed successively while the film is being rewound, and these operations are continuous so long as the electric circuits controlling the apparatus are closed.

The moving picture apparatus herein shown and described is particularly adapted for advertising purposes, as for example, to illustrate the manner in which a given article is manufactured, but the use of the apparatus is not so limited, because it will be apparent that it may be applied for amusement, entertainment or educational purposes to equal advantage.

In the form of the invention which I have herein illustrated, I employ a frame comprising suitable side members 20, 21, preferably of similar construction and secured to one another by a plurality of spacer and connecting rods 22, to the opposite ends of which are secured nuts 23 to hold the parts together. A motor 24 is mounted with its base 25 on a bracket 26 secured in any desired manner to the frame of the machine. One end of the motor shaft 27 is connected to one end of a drive shaft 28, the opposite end of which is journaled in a bearing 29 fixed in the frame of the machine. On the drive shaft 28 is a worm 30, meshing with which is a gear wheel 31 mounted on a shaft 32 which extends between and is journaled in the side members of the frame of the machine. On the shaft 32 is a pinion 33. This pinion 33 meshes with a gear wheel 34 mounted on a shaft 35, which also extends between and is journaled in the side members of the frame of the machine. On one side of the gear wheel 34 there is a broken circular flange 36 and a pin 37, these members forming parts of a well known intermittent movement, the other member of which is a cam wheel 39 mounted on a shaft 40, which also extends between and is suitably journaled in the side members of the machine. The curved surfaces 41 of the cam wheel 39 register with the surface of the flange 36 and between each curved surface 41 there is a radial slot 42 adapted to receive the pin 37, so that by the revolution of the gear wheel 34, the cam wheel 39 and shaft 40 are intermittently turned a partial revolution.

On the shaft 40 there are sprocket wheels 43 and journaled in the side members of the machine and preferably immediately above the shaft 40 is a similar shaft 44, mounted on which there is a pair of sprockets 45. At the other end of the machine there is a shaft 46 corresponding to the shaft 44 and on this shaft there is mounted a pair of sprockets 47. Beneath the shaft 46 there is a shaft 48 on which there is mounted a pair of sprockets 49. Passing over the sprockets 43, 45, 47 and 49, are chains 50 which perform the function of endless conveyers for the slide plates hereinafter described. In suitably spaced positions slide plate frames 51 are connected at their opposite sides in the links of the chains 50, and each slide plate frame 51 is adapted to receive and carry a slide plate indicated at 52. The chains 50, during that portion of their travel in which the slide plates are carried along their upper horizontal positions, pass through guides 53 in order to insure the slides being maintained in their proper positions for projecting the design on each slide properly on to a screen, and as will be understood, the relation of the parts is such that while the travel of the endless conveyer chains 50 is continued, the slide plates are successively brought into position to be projected on the screen. This, as illustrated in the drawing, is preferably a central position lengthwise of the apparatus.

For projecting the slides on the screen, I have illustrated the use of an electric lamp bulb 54, suitably secured in the socket 55 mounted in the frame of the machine, and also a condenser 56 secured in position in the frame between the lamp bulb and the stationary operative position of a slide, as well as a lens mounted immediately above the lamp bulb and condenser by means of a plate 58 extending across the side members of the machine and secured in posts 59 which are suitably attached to the side members of the machine. This portion of the apparatus, as will be recognized, is an ordinary stereopticon structure in which the slides are caused to move intermittently and by this intermittent movement are successively brought into position to be projected on the screen. This latter however forms no part of my invention and is not illustrated.

Figure 8:
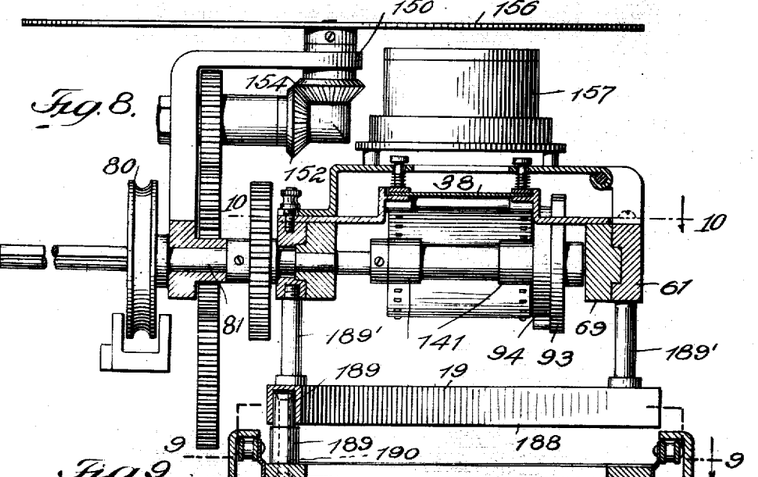
Fig. 8 is a sectional elevation taken on line 8—8, Fig. 1.
Figure 9:
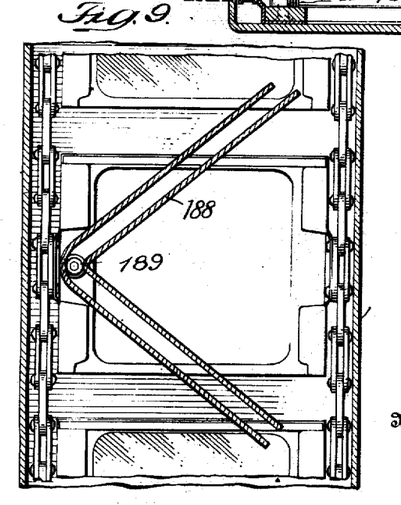
Fig. 9 is a sectional plan taken on line 9—9 Fig. 8.

I also employ a film carriage adapted to be reciprocated transversely of the machine so as to bring the film into the optical center of the projecting device of the apparatus. This film carriage preferably comprises side rails 60 and 61 connected to one another in spaced positions by the tie-rods 62 and 63. This carriage is mounted to reciprocate on the spacer rods 64 and 65, which with other similar rods secure the side members 20 and 21 of the frame together. On the spacer rod 64 there are collars 66, and in similar positions on the spacer rod 65 there are collars 67, these collars being employed to determine and limit the travel of the film carriage. Also connected to the film carriage are bearing plates 68, 69; these are secured to one another in spaced positions by means of the tie rods 70 and 71, and these bearing plates preferably are ribbed on their outer sides while the inner sides of the rails 60 and 61 are recessed to receive the ribs on the bearing plates, as clearly indicated in Figs. 3 and 8 of the drawing. Associated with the film carriage is an auxiliary bearing plate 72, which as indicated, is secured in position exteriorly of the side rail 60 by means of tie bolts 73, 74, or otherwise.

The mechanism hereinafter described as associated with the film carriage, is driven by a motor 75, the base 76 of which is mounted on the bracket 77 suitably secured in the frame of the machine. On the shaft of the motor 75 there is a pulley 78. A spring belt 79 passes over the pulley 78 and also over a pulley 80 mounted on a shaft 81, which is journaled in the auxiliary bearing plate 72 and in the bearing plate 68. On the shaft 81 there is a gear wheel 82. The gear wheel 82 meshes with the gear wheel 83 mounted on a shaft 84 which is journaled in the bearing plates 68 and 69 and also in the auxiliary bearing plate 72. Similarly on the other side of the apparatus, the gear wheel 82 meshes with the gear 85 mounted on the shaft 86, which is journaled in the bearing plates 68, 69 and the auxiliary bearing plate 72. On the shaft 84 there is also secured a gear wheel 87 which meshes with a gear wheel 88 mounted on a shaft 89, the shaft 89 being journaled in the bearing plates 68, 69, and the auxiliary bearing plate 72. Corresponding with these last named gears on the other side of the apparatus, a gear 90 is mounted on the shaft 86 and meshes with the gear wheel 91 mounted on a shaft 92 which is journaled in the bearing plates 68, 69, and the auxiliary bearing plate 72.

On the shaft 84, a disk 93 is mounted. This disk 93 is provided with a broken flange 94, and a pin 95 on the same side thereof. Adjacent the disk 94 there is a cam wheel 96 mounted on the shaft 97 which is journaled in the bearing plates 68, 69. The curved surfaces 98 of the cam wheel 96 are adapted to engage the surface of the flange 94 and between each curved surface of the cam wheel, there is a slot 99 adapted to be entered by the pin 95 so that through the revolution of the disk, intermittent motion is imparted by the cam to the shaft 97. On the shaft 97 in spaced positions there are film sprockets 100 coacting with grooved rollers 101 mounted on a shaft 102 which is also journaled in the bearing plates 68 and 69. Similarly on the other side of the film carriage there is a disk 103 provided on one face with a broken circular flange 104. On the same side of the disk there is a pin 105 and adjacent the disk there is a cam wheel 106 mounted on a shaft 107, the ends of which are journaled in the bearing plates 68 and 69. The curved surfaces 108 of the cam wheel 106 bear against the surface of the flange 104 and between the curved surfaces of the cam wheel there are slots 109 adapted to be entered by the pin 105 so that through the revolution of the disk 103, intermittent motion is imparted to the shaft 107 upon which the cam wheel 106 is mounted. On the shaft 107 there are spaced film sprockets 110 coacting with grooved rollers 111 mounted on a shaft 112 which is journaled at its ends in the bearing plates 68 and 69.

On the shaft 89 and in line with the film sprockets 100 there are film sprockets 113 coacting with grooved rollers 114 secured on a shaft 115, the ends of which are journaled in the bearing plates 68 and 69. Similarly on the other side of the machine and in line with the film sprockets 110 there are film sprockets 116 mounted on the shaft 92 and coacting with grooved rollers 117 secured on a shaft 118 the ends of which are also journaled in the bearing plates 68 and 69.

At one end of the machine the film carriage is provided with brackets 119 in which there is journaled a shaft 120 which extends across the film carriage. Centrally this shaft 120 is provided with a collar 121 held frictionally in contact therewith by any suitable means so as to turn thereon if sufficient turning force is exerted to overcome the frictional contact, and one end of the film indicated at 38 is suitably secured to this collar 121. At one end of the shaft 120, a sprocket 122 is fixed, while in line therewith on the shaft 89 there is a similar sprocket 123. A chain 124 passes over the sprockets 122 and 123, so that the shaft 120 is driven from the shaft 89 and through the sprockets 122, 123, and chain 124. Associated with this shaft 120 is a reel case 125 having a cover 126 which is preferably hinged thereto as indicated at 127. On the opposite end of the film carriage there is a similar construction, brackets 128 being secured to this end of the film carriage and having mounted therein a shaft 129. On this shaft 129 there is a collar 130 similar in all respects to the collar 121 on the shaft 120. Also on the shaft 129 there is a sprocket 131 and in line therewith on the shaft 92, a similar sprocket 132. A chain 133 passes over the sprockets 131 and 132 so as to turn the shaft 130 from the shaft 92. With the shaft 130 there is also associated a reel case 134 provided with a cover 135 which is preferably hinged thereto as indicated at 136.

Figure 5:
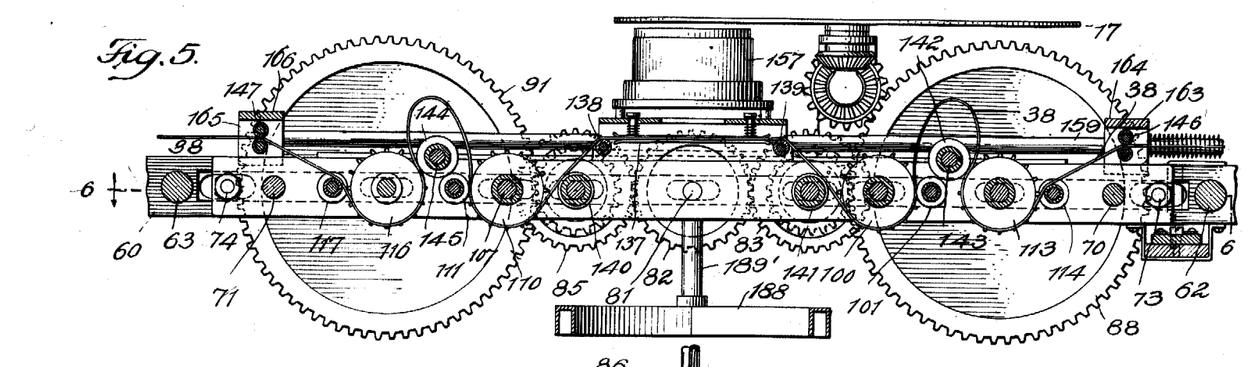
Fig. 5 is a similar view of the same parts on an enlarged scale, taken on line 5—5, Fig. 6.
Figure 6:
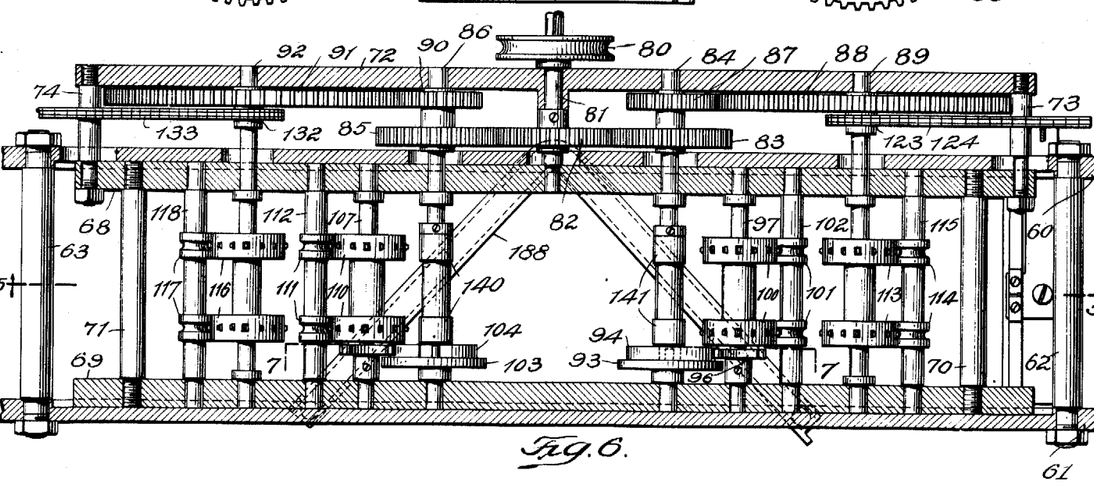
Fig. 6 is a sectional plan on line 6—6 Fig. 5.
Figure 7:
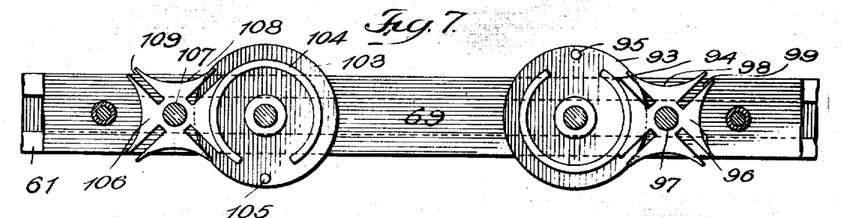
Fig. 7 is a sectional elevation on line 7—7, Fig. 6.
Figure 10:
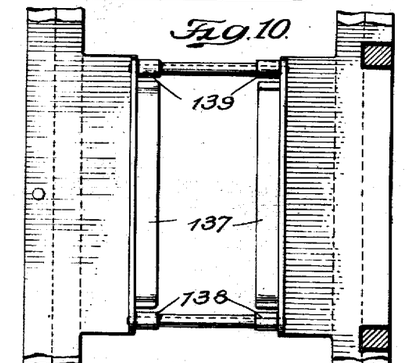
Fig 10 is a sectional plan taken on line 10—10, Fig. 8.

A strip of film which is indicated at 38 is passed through guide members 137, plainly indicated in Fig. 10, and over guide rolls 138 and 139. The film then passes over the guide surfaces 140, 141 provided therefor on the shafts 84 and 86 and under the film sprockets 100 and 110 and between the same and the coacting rollers 101 and 111 respectively. The film is then looped as plainly indicated in Fig. 5 and passes around the under side of the film sprockets 113 and 116 and the grooved rollers 142 and 144 coacting therewith. The rollers 142 are mounted on a shaft 143 journaled in the bearing plates 68, 69, while the rollers 144 are mounted on a shaft 145 also journaled in the bearing plates 68, 69. The film at the opposite sides of the film sprockets 113 and 116 passes over the rollers 114 and 117 respectively and through idlers 146 and 147, which will be hereinafter more particularly described, and thence into the reel cases 125 and 134, passing between idlers 148 and 149 provided therefor respectively in these reel cases, where the respective ends of the film are suitably secured to the collars 121 and 130.

Secured in a suitable position in the frame of the film carriage there is a bracket 150. A shaft 151 is journaled in this bracket and provided with a gear 152 meshing with the gear 91 and also on the shaft 151 is a beveled gear 153 meshing with the beveled gear 154 mounted on the shaft 155 at right angles to the shaft 151 and suitably secured to which is a diaphragm 156. The diaphragm is provided with suitable openings permitting the light to pass through the film when the motion thereof is arrested, as is customary in moving picture machines. Also suitably secured in position in the film carriage is an auxiliary lens 157 and an auxiliary condenser 158 coacting therewith, the auxiliary condenser being supported upon depending arms 158' connected to the film carriage.

Figure 1:
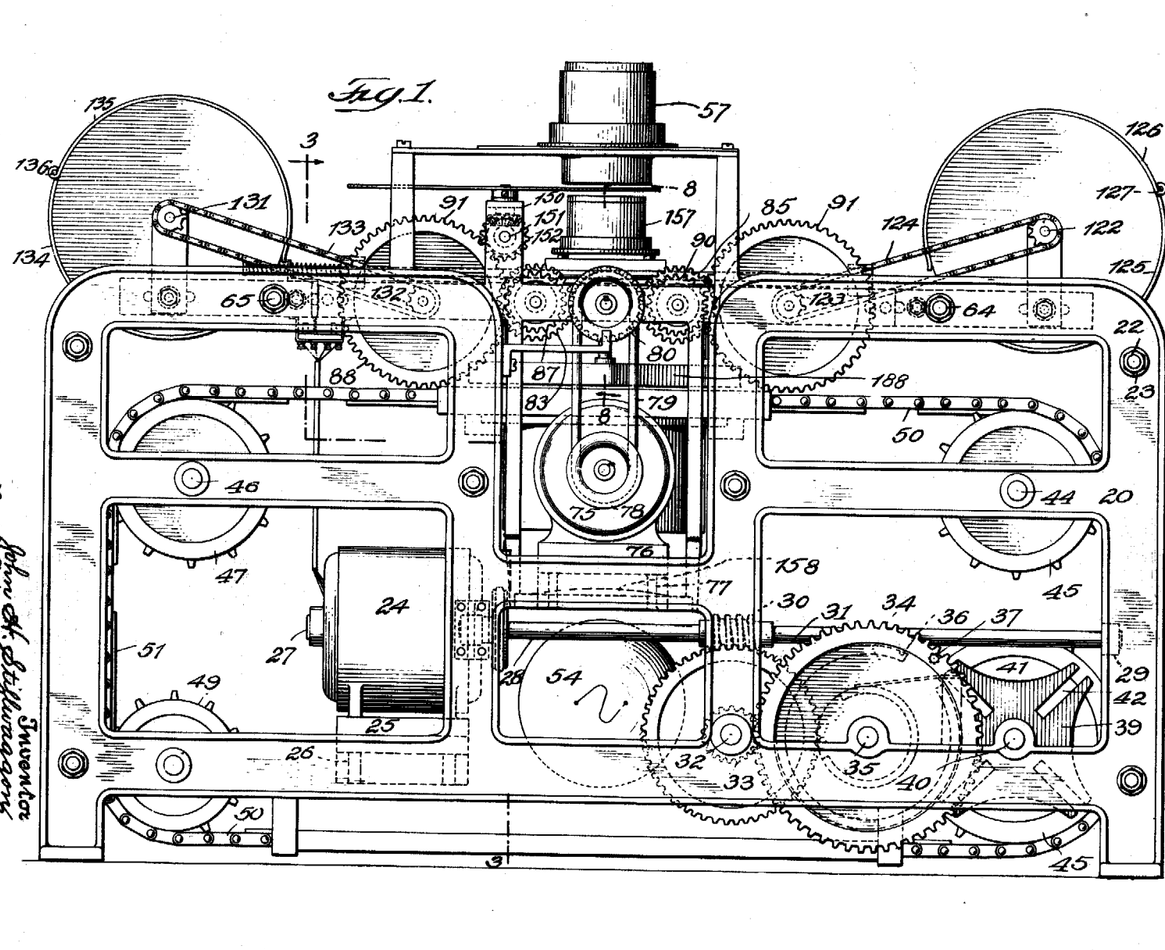
Figure 1 is a side elevation of a moving picture machine made in accordance with my present invention.
Figure 2:
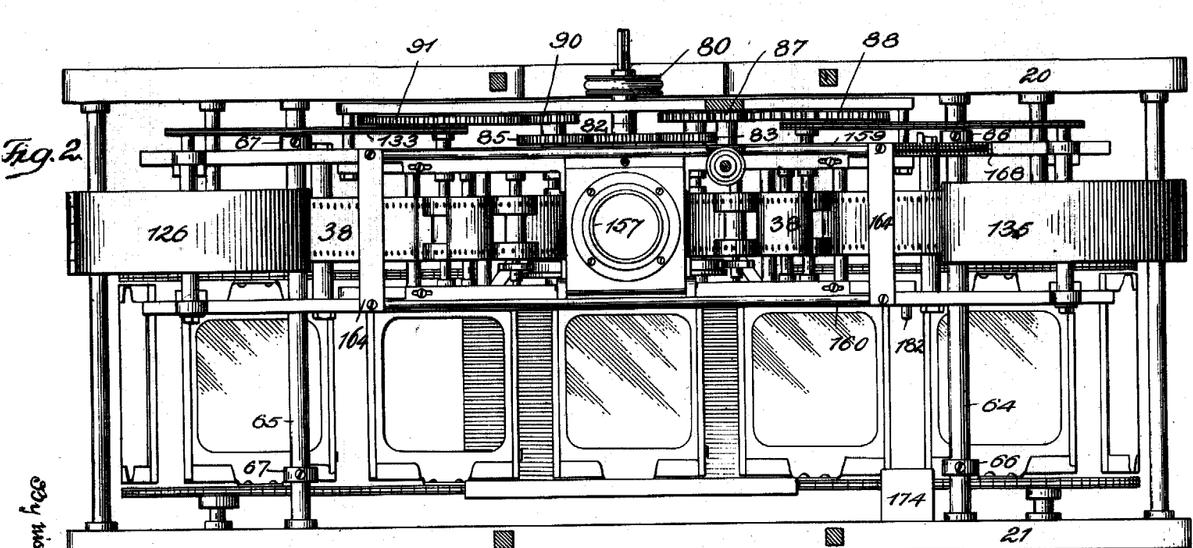
Fig. 2 is a plan of the same.

Associated with the film carriage I provide an auxiliary contact carriage adapted to be reciprocated longitudinally thereof. This auxiliary contact carriage preferably comprises rods 159 and 160 mounted above the frame of the film carriage. At corresponding ends thereof blocks 163 are secured to the rods 159, 160 and a cross bar 164 extends between the blocks 163. Similarly at the opposite ends of the rods 159 and 160 there are blocks 165 secured thereto, and a cross bar 166 extends between the blocks 165 and is suitably connected therewith. The idlers 146 are journaled at their ends in the blocks 163 and the idlers 147,— to which reference has hereinbefore been made—are journaled at their ends in the blocks 165. The rod 159 at one end thereof extends appreciably beyond the block 163 secured thereto and is provided with a helical spring surrounding this extending end of the rod and extending between the block 163 and a head 168 provided thereon, and as indicated in Fig. 2 of the drawing. On this end of the rod 159 there is an angle bracket 169 carrying a depending arm 170 adapted to actuate a switch 171 employed in controlling the circuits to the motor 75 which drives the film actuating mechanism, this switch being supported in a suitable strap 172 secured to the film carriage or otherwise, and the construction and operation of this switch will be hereinafter more particularly described.

Figure 11:
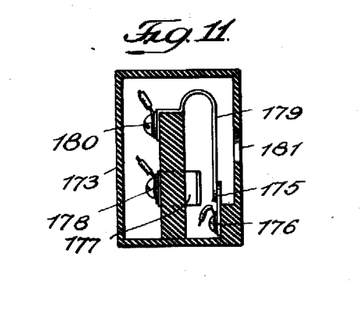
Fig. 11 is a sectional elevation of the switch employed to make and break the current to and from the motor employed to drive the slide mechanism and to start the motor employed to drive the film mechanism.
Figure 12:
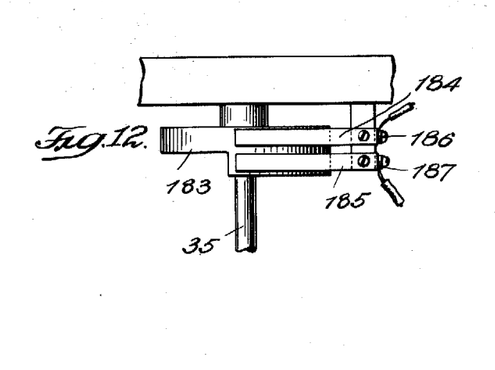
Fig. 12 is a plan of the switch employed to open and close the circuit to the motor employed to drive the slide mechanism.

I also employ a housing 173 secured to the side frame member 21 of the machine for inclosing a switch 174 for the control of the circuits for operating the machine. This switch preferably includes a contact 175 and the terminal 176, the contact 177 and its terminal 178 together with a contact arm 179 and its terminal 180, the housing being provided with an aperture 181 through which a pin 182 extends when the film carriage is suitably moved so as to strike the contact arm 179 and move the same from the position shown in Fig. 11 to a position in which at its free end it bears against the contact 177, and as will be hereinafter more particularly described. For controlling the circuits to properly operate the mechanism, I also employ a rotary switch mounted on a shaft 35 so as to turn therewith and provided with contacts 184 and 185 having the respective terminals 186 and 187.

In order to effect the reciprocating movement of the film carriage and the parts associated therewith, I employ a cam 188. This as particularly shown in Figs. 4, 5, 6, 8, and 9, is a channel iron of angular shape, in plan, and is secured to the under side of the film carriage by suitable posts depending therefrom and indicated at 189'. Coöperating with this cam 188, I employ a roller 189 adapted to revolve on a pin 190 suitably secured in one of the slide plate frames 51, as is clearly indicated in Figs. 8 and 9 of the drawings. The slide plate frame carrying the pin 190 and the roller 189 is not provided with a slide in order to permit the light unobstructed to pass through the frame in projecting a picture from the moving film, and as will be apparent, when the slide plate frame carrying the roller 189 approaches the center of the machine, the roller will enter the channel in the cam and the continued movement of the slide plate frame by the endless conveyer chain carrying the same, will cause the film carriage and parts associated therewith to move from their initial position, as shown in Fig. 2 of the drawing, to the position shown in Figs. 8 and 9, in which as will be understood, the film guide with the film between the same and the auxiliary lens 157 and condenser 158 will be brought into the optical center of the projecting apparatus of the machine, and as hereinafter described, these parts will remain in this position so long as the moving picture film is being operated.

Referring again to the switch 171, the same preferably includes a plate 191 adapted to be oscillated, and carrying contact arms 192, 193, 194 and 195. The contact arm 192 is adapted to bear against the contact point 196 or the contact point 197 suitably fixed in the base of the switch. The contact arm 193 is adapted to bear against either one of the contact points 198 or 199 fixed in the base of the switch, while the contact arms 194 and 195 are adapted to bear against the contact points 200 and 201 to be removed therefrom. The plate 191 also includes an arm 202 provided with a slot 203 adapted to receive the end of the depending arm 170 so that through the movement of the auxiliary contact carriage the switch 171 may be thrown from one to the other of its positions, as will be hereinafter more particularly explained.

Figure 14:
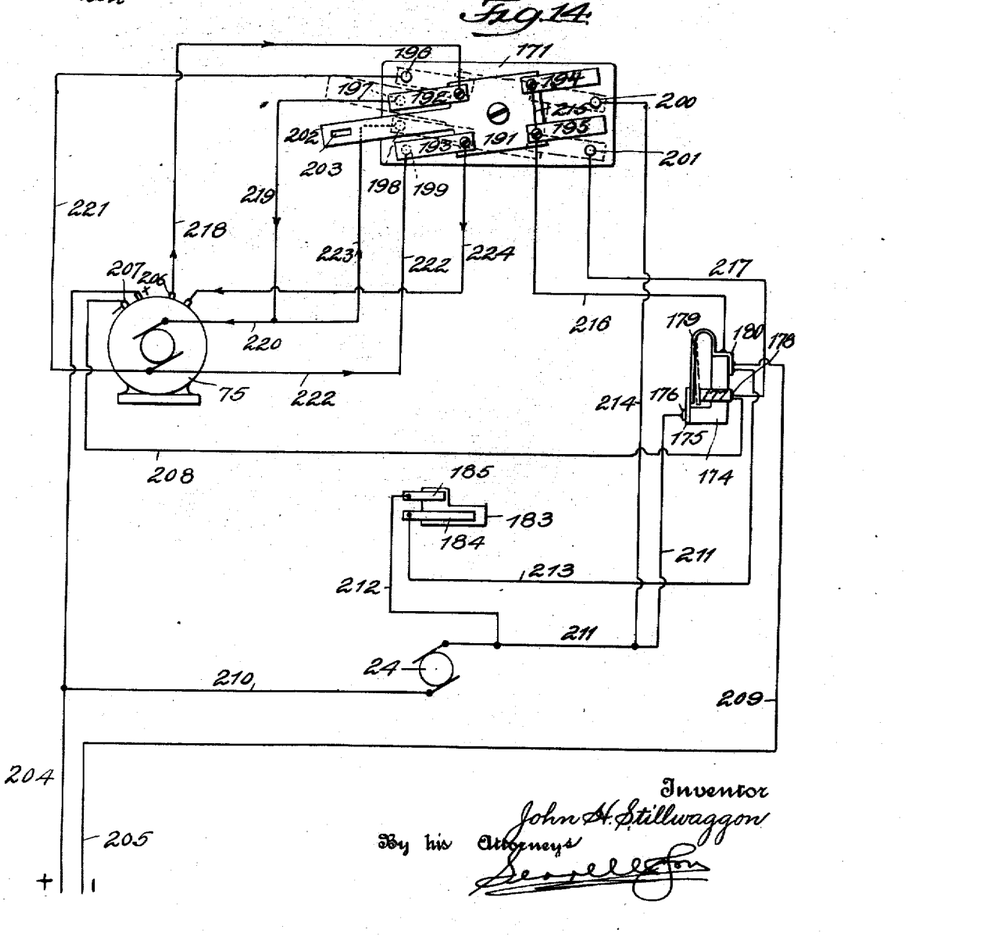
Fig. 14 is a diagrammatic plan of the circuits employed.
Figure 15:
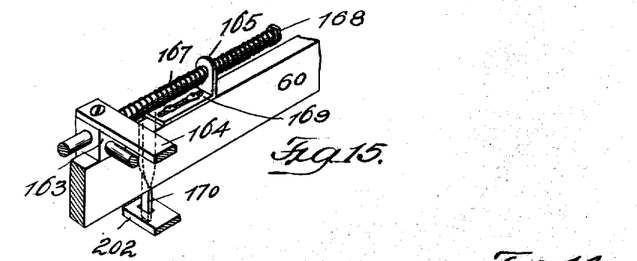
Fig. 15 is a perspective view of a portion of the carriage and the lever arm employed to actuate the switch for reversing the motor for driving the film mechanism and for opening and closing the circuit to the same.

Referring to Fig. 14 of the drawing, electrical circuits for operating the hereinbefore described apparatus include the lead wires 204 and 205, the former of which is connected to one terminal 206 of the motor 75 for actuating the film mechanism while the opposite terminal 207 of this motor is connected by a lead wire 208 to the terminal 178 of the contact 177 of the switch 174, while the other lead wire 205 is connected by a line 209 to the terminal 180 of the contact 179 of the switch 174. One terminal of the motor 24 for actuating the slide operating mechanism is connected by a line 210 to the lead wire 204 and the circuit is completed to the motor 24 in three ways:— first by the line 211 connecting the opposite terminal of the motor with the terminal 176 of the contact 175, thence through the contact 179 through the line 209, also through a line 212 extending between the line 211 and the contact 185 of the rotary switch 183, through the switch and the other contact 84, by the line 213 to the terminal 180 of the switch 174 and the line 209, and in the third instance through the line 214 extending between the line 211 and the contact point 200 through which when the switch 191 is in the proper position the circuit will be completed through the contact arm 194, the line 215, the line 216 to the terminal 180 of the switch 174 and the lead wire 209. The contact point 201 is connected by a line 217 to the terminal 178 of the contact 177 of the switch 174. One field terminal of the motor 75 is connected by a line 218 with the contact arm 192 and the contact point 197 is connected by a line 219 to a line 220, which line is connected to one of the commutator terminals of this motor. A line 221 connects the contact point 196 with the other commutator terminal of the motor which is also connected by a line 222 with the contact point 199, while the contact point 198 is connected by a line 223 to the line 220 and the contact arm 193 is connected by a line 224 with the other field terminal of the motor.

Figure 3:
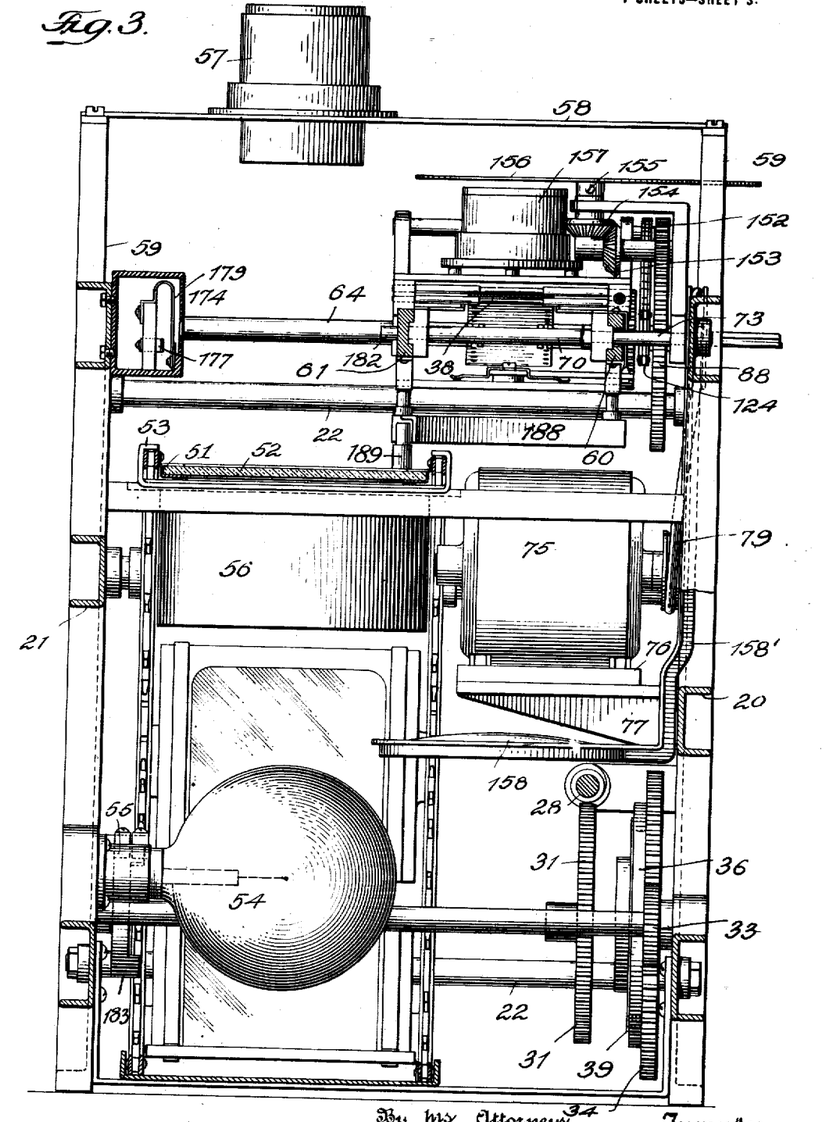
Fig. 3 is a sectional elevation of the apparatus, taken on line 3—3, Fig. 1.
Figures 4, 13:
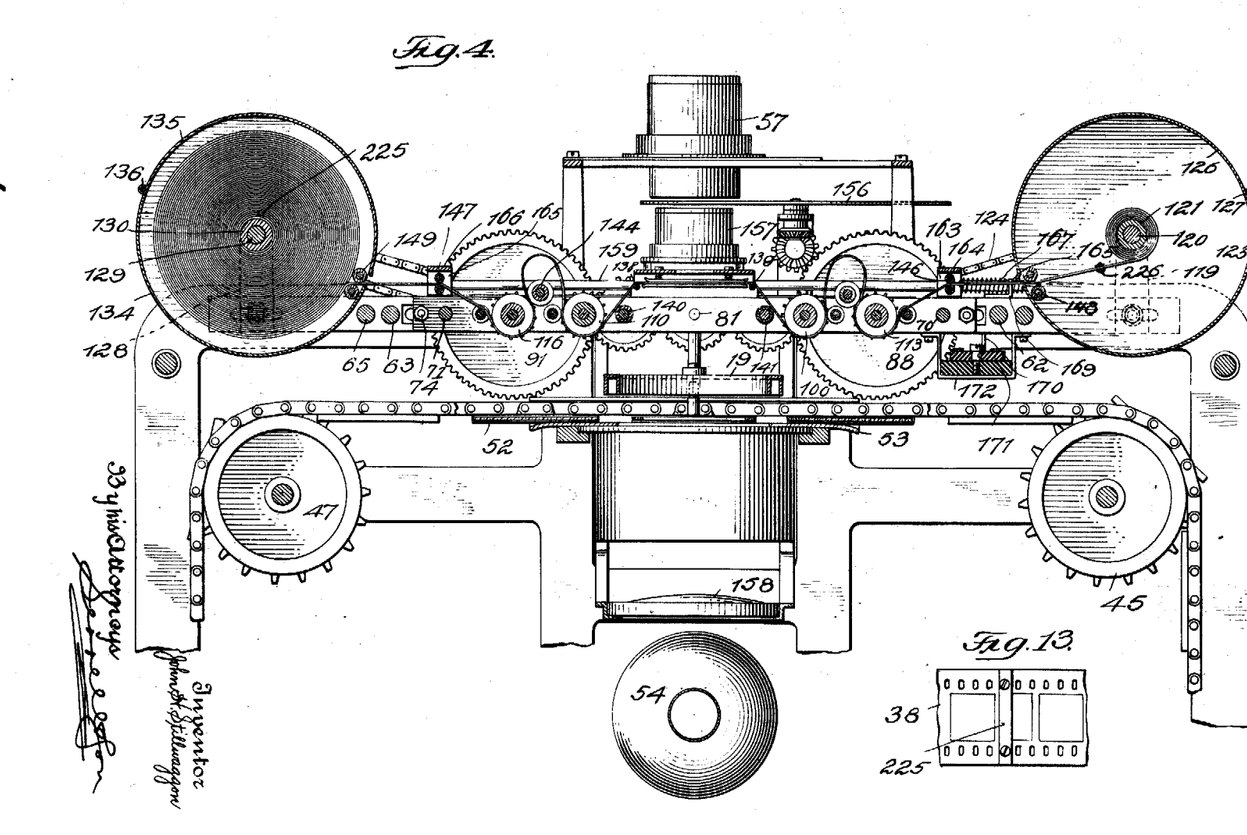
Fig. 4 is an elevation and partial cross section illustrating the film carriage and associated parts.
Fig. 13 is a plan of the portion of the strip of film illustrating the trip bar employed on the ends thereof.

In the operation of the hereinbefore described apparatus, the film carriage and associated parts are normally in the initial position indicated in Figs. 2 and 3 of the drawing, and the switches for controlling the currents for operating the mechanism are normally in the position shown in Fig. 14 of the drawing. Now by closing the circuit by a switch in the lead wires 204 and 205, it will be apparent that this circuit will be closed through the motor 24 for actuating the operating mechanism, this circuit being from the lead 204 through the line 210, motor 24, the line 211, the contact 179, its terminal 180, and the line 209 to the other lead wire 205. The slide actuating mechanism will therefore continue to operate, throwing each successive slide upon a screen until the slide frame carrying the roller 189 approaches the center of the machine, and as will be understood, the designs on the slides are projected successively on the screen. As this slide plate frame approaches the central position, the roller 189 enters the groove in the cam 188 and moves the film carriage and associated parts from the position shown in Figs. 2 and 3 to the position shown in Figs. 8 and 9, in which the roller 189 is at the apex of the channel in the cam and the film carriage has been moved to the extreme limit of its travel in which the auxiliary lens and the auxiliary condenser are brought into position to coöperate with the main lens 57 and the main condenser 56 to project a picture carried by the film onto the screen. As the film carriage is brought into this position, the pin 182 extends through the aperture 181 in the housing 173, moving the contact arm 179 from the position shown in Fig. 11, in which this bears against the contact 175 to the opposite position in which it bears against the contact 177. When the contact 179 is moved to this position, the circuit through the motor 24 is broken at the contact 179, but is still closed through the rotary contact 183. At this time also the circuit is closed to the motor 75 for actuating the film actuating mechanism. The motor 75 therefore turns and through the mechanism hereinbefore described, operates the film, unwinding the same from the reel case 134 and into the reel case 125, the circuit through the motor 75 being closed from the lead wire 204 to the terminal 206 through the lead 218 to the contact arm 192 through the lead 219 to the line 220, to and through the armature of the motor to the lead 222, to the contact arm 193 to the lead 224, to the opposite field terminal of the motor, thence to the opposite terminal 207 of the motor, and by the lead 208 to the contact 177, contact 179 and the lead 209 to the opposite lead wire 205. The apparatus will continue in this operation until the film is nearly played from the reel case 134 and into the reel case 125, or until a trip 225 placed on the film adjacent the end thereof passes between the idlers 149 and strikes the idlers 147. When this stop 225 strikes these idlers, it moves the auxiliary contact carriage through the continuing motion of the film and by the movement of this carriage through the action of the spring 167, the depending arm 170 is moved from left to right as indicated in Fig. 4 of the drawing, thereby swinging the plate 191 of the switch 171 from the position shown in full lines, Fig. 14, to the position shown in dotted lines therein. In this position, the current through the motor 75 is reversed by passing through the lead 218 to the contact arm 192 to the contact point 196 through the lead 221 to one armature terminal, from the other armature terminal through the lead 220, the lead 223 to the contact point 198, through the contact arm 193, the lead 224, the other field terminal, through the field, and to the other motor terminal, and by way of the lead 208 to the contact 177, to the contact 179, the lead 209 to the other lead wire 205. In this position also the circuit is closed to the motor 24 through the lead 214, the contact arm 194 the lead 215, the lead 216, to the terminal 180, the lead 209 to the opposite lead wire 205. This as will be understood causes the endless conveyer to be set in motion again which in turn through the pin 182 and the other side of the cam 188 returns the film carriage and the parts associated therewith to their normal initial position. It will also be understood that as soon as the pin 182 is withdrawn from the housing, the contact 179 returns to its normal position against the contact 175. This ordinarily would break the circuit through the motor 75, were it not for the fact that the contact arm 195 is in a position to bear against the contact 201 so that the circuit through the motor 75 is still closed through the lead 208, the contact 177, the lead 217, the contact arm 195, the lead 216, the contact 180, through the lead wire 209. This condition maintains with the slide mechanism in operation to display the slides successively when the film is being rewound from the film case 125 to the film case 134, until the initial position of the film is reached, that is to say, until the film is rewound in the case 134 so as to be ready for use again.

When the film is so rewound, the trip 226 fixed on the opposite end of the film, passes between the idlers 148 and comes into contact with the idlers 146 on the auxiliary contact carriage. This as will be understood, operates the carriage in the opposite direction, whereby correspondingly moving the arm 170 and throwing the switch 171 back to the full lines position shown in Fig. 14. This opens the circuit to the motor 75, so that the film actuating mechanism remains inoperative until the film carriage is moved again as described, to cause the pin 182 to move the contact 179 so as to close the circuit to the motor 75, in which position as will be understood, the operation of the machine is repeated. The purpose of employing the rotary switch 183 is to continue the operation of the motor 24 and the movement of the slide apparatus until such a time after the film apparatus has been started, as to bring the parts of the stop motion for the slide mechanism into such a position that the pin 37 is about ready to enter one of the slots 42, the reason for this being that in again starting the slide mechanism, it is desirable to have the film carriage and its mechanism moved out of the way, so that the picture on the film will not be displayed in its reverse order on the screen. With the parts in this position, return movement of the film carriage to its initial position begins immediately upon the starting of the slide carrying mechanism.

The apparatus hereinbefore shown and described has proved satisfactory in all respects for an advertising machine. It may be necessary however in operating moving pictures for theaters to shift the slide projecting lens 57 out of position when the moving picture projecting apparatus is moved into position for use, in which instance as will be understood, a regular moving picture projecting lens is employed in lieu of the auxiliary lens 157. The same form of condensers however, are employed in this type of machine as those hereinbefore described.

It will also be understood as hereinbefore intimated, my invention includes an apparatus in which a plurality of film reels are employed in pairs together with a film moving mechanism associated with each pair of reels and in which each pair of reels and their corresponding film moving mechanism may be automatically moved from an initial inoperative position to an operative position and then actuated and automatically returned from the operative position to an inoperative position, and the film rewound automatically.

I claim as my invention:

1. In a machine of the class described, devices for projecting a slide, a moving picture apparatus normally in an inoperative position, and means operated at predetermined intervals by said devices for projecting a slide for shifting the moving picture apparatus from its inoperative position to an operative position.

2. In a machine of the class described, a plurality of slides, means for moving the same, a slide projecting apparatus and a moving picture projecting apparatus adapted to intermittently move into and out of the optical center of said projecting devices.

3. In a machine of the class described, a plurality of slides, means for moving the same, slide projecting devices, a slidable carriage, a film operating mechanism mounted in said carriage, and means whereby automatically at predetermined intervals the said carriage is moved from an initial inoperative position to an operative position in the optical center of said projecting devices and then returned to its initial position.

4. In a machine of the class described, a plurality of slides, means for moving the same, slide projecting devices, a shiftable carriage, a moving picture projecting apparatus mounted on said carriage, means for actuating the moving picture projecting apparatus, and means for moving the shiftable carriage from an initially inoperative position to an operative position in the optical center of the said projecting devices and after the moving picture is shown to return the carriage to its initial position.

5. In a machine of the class described, a plurality of slides, means for moving and successively projecting the same on a screen, a shiftable carriage, a moving picture apparatus mounted on said carriage, means for actuating the moving picture apparatus, and means whereby automatically at predetermined intervals the shiftable carriage and moving picture apparatus thereon are shifted from an initially inoperative position to an operative position, the moving picture apparatus started, and the slide projecting apparatus stopped and after the moving picture is shown the moving picture apparatus and carriage on which it is mounted are returned to their initial position and the slide projecting apparatus started again.

6. In a machine of the class described, a plurality of slides, means for moving and successively projecting the same on a screen, a shiftable carriage, a moving picture apparatus mounted on said carriage, means for actuating the moving picture apparatus, and means whereby automatically at predetermined intervals the shiftable carriage and moving picture apparatus thereon are shifted from an initially inoperative position to an operative position, the moving picture apparatus started, and the slide projecting apparatus stopped and after the moving picture is shown, the moving picture apparatus and carriage on which it is mounted are returned to their initial position and the film rewound, and the slide projecting apparatus started again.

7. In a machine of the class described, a plurality of slides, means for moving the same, a source of light, a condenser, a lens, said light, condenser and lens being employed to project the slides, a film moving apparatus, an auxiliary lens and condenser associated therewith, and devices for automatically shifting the film moving apparatus and its lens and condenser from an initially inoperative position to an operative position in which the said auxiliary lens and condenser are brought into the same optical center as that of the aforesaid lens and condenser, and after the moving picture is shown to return the film moving apparatus and its auxiliary lens and condenser to their inoperative position.

8. In a machine of the class described, an endless conveyer, a plurality of slides mounted thereon, means for imparting an intermittent movement to the endless conveyer and slides carried thereby, projecting devices for said slides, a moving picture projecting apparatus and means actuated intermittently by the endless conveyer for shifting the moving picture projecting apparatus from an initially inoperative position to an operative position for projecting the pictures on the film and for returning the moving picture projecting apparatus to its initial position.

9. In a machine of the class described, a slide carrier, means for operating the same, a slide projecting apparatus, a shiftable carriage, a film moving mechanism mounted on said carriage, a film projecting apparatus, and means actuated at predetermined intervals by the slide carrier for shifting the said shiftable carriage from an initially inoperative position to an operative position in which the optical center of the film projecting apparatus coincides with that of the slide projecting apparatus, and after the moving picture is shown, returning the shiftable carriage to its initial position.

10. In a machine of the class described, a slide carrier, means for imparting an intermittent movement thereto, a slide projecting apparatus, a shiftable carriage, a film moving mechanism mounted on said carriage, a film projecting apparatus associated with the film moving mechanism, means actuated at predetermined intervals by the slide carrier for shifting the said carriage from an initially inoperative position to an operative position in which the optical center of the film projecting apparatus coincides with that of the slide projecting apparatus, devices operative when the carriage is moved to its operative position for actuating the film moving mechanism and stopping the slide operating means, and means operative after the carriage has been returned to its initial position for again starting the slide operating means.

11. In a machine of the class described, a slide carrier, means for imparting an intermittent movement thereto, a slide projecting apparatus, a shiftable carriage, a film moving mechanism mounted on said carriage, a film projecting apparatus associated with the film moving mechanism, means actuated at predetermined intervals by the slide carrier for shifting the said carriage from an initially inoperative position to an operative position in which the optical center of the film projecting apparatus coincides with that of the slide projecting apparatus, devices operative when the carriage is moved to its operative position for actuating the film moving mechanism and stopping the slide operating means, and means operative after the carriage and film moving mechanism are returned to their initial position for reversing the film moving mechanism to rewind the film and again starting the means for operating the slide carrier.

12. In a machine of the class described, a slide carrier, means for operating the same, a pin carried by said slide carrier, a slide projecting apparatus, a shiftable carriage, a film projecting apparatus mounted on the said carriage and a cam secured to the said carriage and adapted to be engaged by the said pin so that at predetermined intervals in the travel of the slide carrier the shiftable carriage and film projecting apparatus mounted thereon are moved from an initially inoperative position to an operative position and then returned to their inoperative position.

13. In a machine of the class described, a slide carrier, a motor for actuating the same, a slide projecting apparatus, a shiftable carriage, a film projecting apparatus mounted on said carriage, a motor for actuating the film projecting apparatus, a pin secured in the said slide carrier, a cam secured to the said shiftable carriage and adapted to be engaged at predetermined intervals by said pin to move the carriage from its initially inoperative position to an operative position and to return the carriage to its inoperative position, and devices whereby the motor for actuating the slide carrier is stopped and the motor for actuating the film projecting apparatus is started when the carriage is shifted to its operative position and the motor for operating the slide carrier is started again and the motor for actuating the film projecting apparatus is stopped when the carriage is returned to its inoperative position.

14. In a machine of the class described, a slide carrier, a motor for actuating the same, a slide projecting apparatus, a shiftable carriage, a film projecting apparatus mounted on said carriage, a motor for actuating the film projecting apparatus, a pin secured in the said slide carrier, a cam secured to the shiftable carriage and adapted to be engaged at predetermined intervals by said pin to move the carriage from an initially inoperative position to an operative position and to return the carriage to its inoperative position, and devices whereby when the said carriage is shifted to its operative position the motor for operating the slide carrier is stopped and the motor for actuating the moving picture projecting apparatus is started, and after the moving picture on the film has been shown, for reversing the motor for actuating the film projecting apparatus to rewind the film and starting the motor for actuating the slide carrier when the carriage is returned to its initial position and for stopping the motor for actuating the film projecting apparatus after the film has been rewound.

15. In a machine of the class described, devices for successively projecting a plurality of slides, a film operating mechanism normally in an inoperative position, and means operative at predetermined intervals by said devices for successively projecting a plurality of slides for shifting the film operating mechanism into an operative position and after the film has been moved a predetermined extent, shifting the film operating mechanism back to its inoperative position.

16. In a machine of the class described, a slide, means for projecting the slide on a screen, a film operating mechanism normally in an inoperative position, and means operated at predetermined intervals by said means for projecting the slide on a screen for moving the film operating mechanism into and out of its operative position.

17. In a machine of the class described, a slide carrier, a slide mounted therein, a moving picture apparatus normally in an inoperative position, and means actuated at predetermined intervals by the slide carrier for shifting the moving picture apparatus into an operative position.

18. In a machine of the class described, a slide carrier, a slide therein, means for imparting an intermittent movement to the slide carrier, a film operating mechanism normally in an inoperative position, and means actuated by the slide carrier at predetermined intervals for shifting the film operating mechanism into and out of an operative position.

19. In a machine of the class described, an endless carrier, a plurality of slides mounted therein, means for imparting an intermittent movement to the said endless carrier, a carriage, a film operating mechanism mounted in said carriage, and means for shifting the said carriage and film operating mechanism at predetermined intervals into and out of an operative position.

20. In a machine of the class described, an endless carrier, a plurality of slides mounted therein, means for imparting an intermittent movement to the said endless carrier, a slidable carriage, a film operating mechanism mounted on the said carriage and normally in an inoperative position, and means actuated by the said endless carrier at predetermined intervals for shifting the said carriage and film operating mechanism from an inoperative to an operative position and after the film has been moved a predetermined distance to return the carriage and the film operating mechanism to their normal inoperative position.

21. In a machine of the class described, a slide projecting apparatus, a film operating mechanism, and means operated by the slide projecting apparatus for alternately moving the film operating mechanism into and out of an operative position.

22. In a machine of the class described, a slide carrier, slide projecting devices, a film operating mechanism, and means operated by the slide carrier for moving the film operating mechanism into and out of position.

23. In a machine of the class described, a slide carrier, projecting devices, a film operating mechanism, means operated by the slide carrier for moving the film operating mechanism into and out of an operative position, and means whereby when the film operating mechanism is moved into its operative position the slide carrier is stopped and the film operating mechanism actuated.

24. In a machine of the class described, a slide carrier, projecting devices, a film operating mechanism, means operated by the slide carrier for moving the film operating mechanism into and out of an operative position, and means whereby when the film operating mechanism is moved into its operative position, the slide carrier is stopped and the film operating mechanism actuated, and after the film actuating mechanism is operated a predetermined extent in one direction the same is reversed the slide carrier actuated again and the film operating mechanism returned to its initial position.

25. In a machine of the class described a slide carrier, projecting devices, a film operating mechanism, means operated by the slide carrier for moving the film operating mechanism into and out of an operative position, and means whereby when the film operating mechanism is moved into its operative position the slide carrier is stopped and the film operating mechanism actuated, and after the film actuating mechanism is operated a predetermined extent in one direction the same is reversed, the slide carrier actuated again, and the film operating mechanism returned to its initial position, and when the film operating mechanism has been actuated in the reverse direction sufficiently to rewind the film the same is stopped.

JOHN H. STILLWAGGON.